July 17, 1962
T. C. GERNER
3,044,798
REPLACEMENT UNIT FOR IDLER ARM BRACKET
Filed March 6, 1959
2 Sheets-Sheet 1
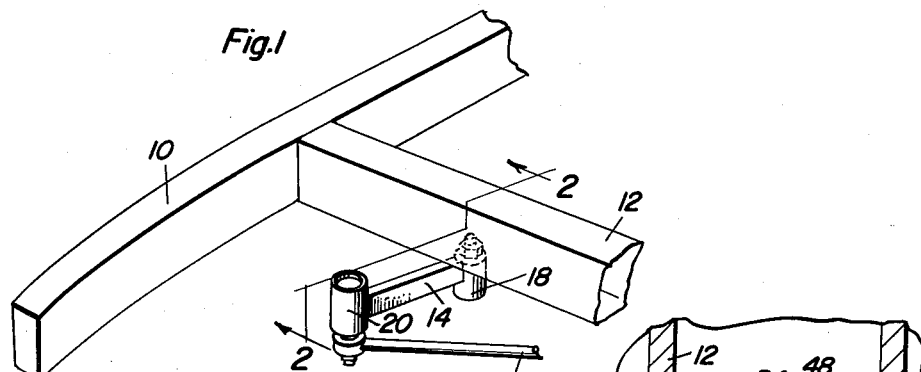
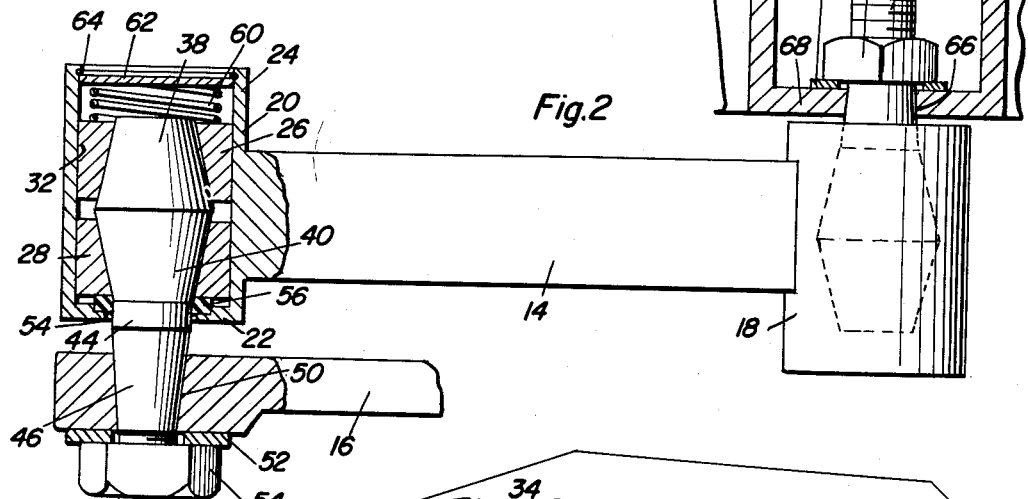
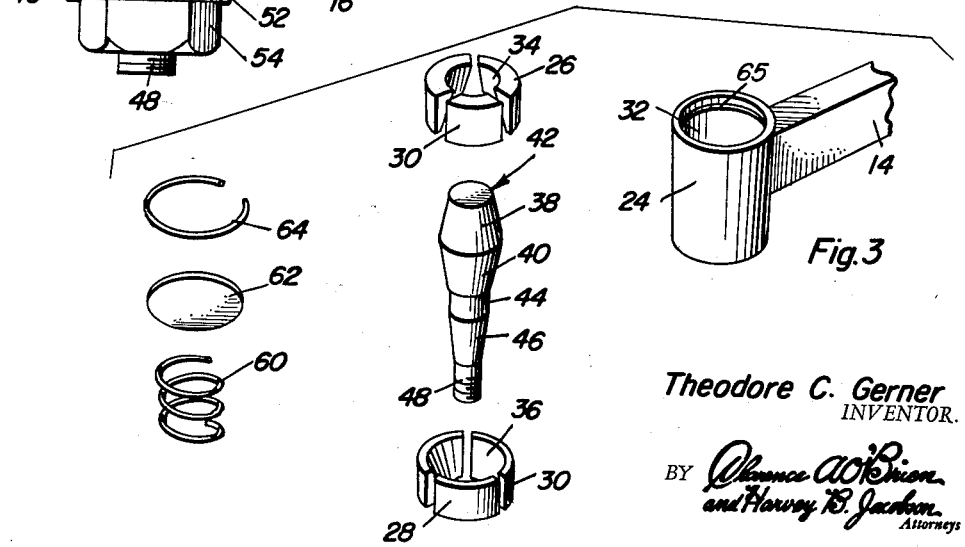
Theodore C. Gerner
INVENTOR.

July 17, 1962
T. C. GERNER
3,044,798
REPLACEMENT UNIT FOR IDLER ARM BRACKET
Filed March 6, 1959
2 Sheets-Sheet 2
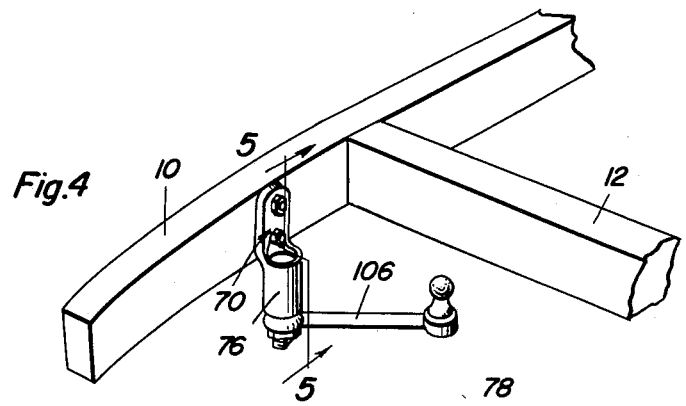
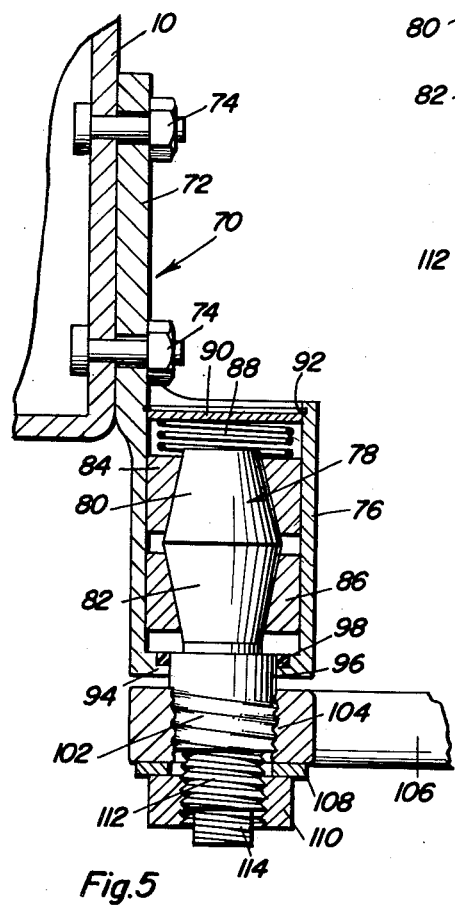
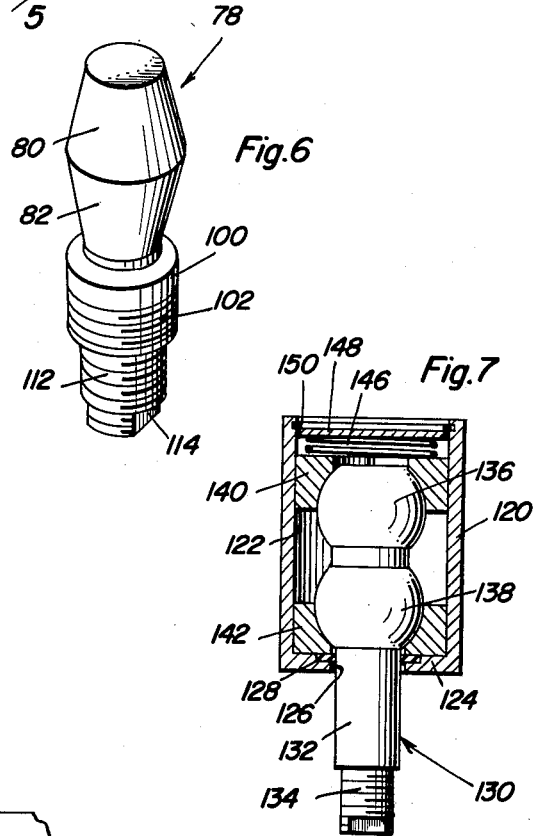
Theodore C. Gerner
INVENTOR.

United States Patent Office 3,044,798
Patented July 17, 1962

3,044,798
REPLACEMENT UNIT FOR IDLER ARM BRACKET
Theodore C. Gerner, P.O. Box 4305, Oklahoma City, Okla.
Filed Mar. 6, 1959, Ser. No. 797,645
7 Claims. (Cl. 280—95)

This invention comprises a novel and useful replacement unit for idler arm brackets, and more specifically pertains to a wear takeup replacement assembly specifically adapted for use with the idler arms forming a part of the steering linkage of automotive vehicles whereby to restore to its original precision fit the worn journaling connections by which an idler arm is supported and is connected to the steering linkage.

This invention relates generally to similar subject matter to that set forth in my copending application Serial No. 779,997, filed December 12, 1959, now Patent No. 2,997,350, for "Self Adjusting Threaded Bushing With Locking Pin" and also is similar in purpose to the construction disclosed and claimed in my further prior copending application Serial No. 782,580, filed December 23, 1958, for "Self-Adjusting Threaded Bushing With Locking Bar," now Patent No. 2,973,208, issued February 28, 1961.

The primary object of this invention is to provide a repair unit including a replacement idler arm together with automatic self-compensating wear takeup swivelling connections for the opposite ends of said idler arm.

A still further object of the invention is to provide a replacement assembly which may be quickly and easily applied by unskilled or semi-skilled labor and which will effectively remove any wear and lost motion in the swivelling connections at the opposite ends of the idler arm.

More specifically, it is an important object of this invention to provide a self-adjusting, wear compensating swivelling connection for securing an idler arm to its mounting upon the frame cross-member of a motor vehicle and to a portion of a steering linkage to which the idler arm is connected.

A further and more specific object of the invention is to provide a self-adjusting, automatically compensating, wear takeup pivotal connection for an idler arm wherein complementary wedging surfaces are provided upon a male pin received in a female box in the idler arm and whereby opposed sets of wedge elements are resiliently urged into contact with the male member for taking up wear.

Still another object of the invention is to provide a wear takeup construction for idler arms which shall be particularly adapted for fabrication from powdered metal and a lubricant material.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a portion of the chassis or framework of a vehicle and showing applied thereto the replacement idler arm unit in accordance with this invention;

FIGURE 2 is a view in vertical transverse section taken upon an enlarged scale substantially upon the plane indicated by the section line 2—2 of FIGURE 1 and showing in particular in vertical section the swivelling connection at an end of the idler arm;

FIGURE 3 is an exploded fragmentary perspective view of the components forming the pivotal connection at one end of the idler arm;

FIGURE 4 is a view similar to FIGURE 1 but showing a modified construction in which the idler arm support consists of a bracket mounted upon a longitudinal side member of the chassis of the vehicle instead of upon the frame cross-member of FIGURE 1;

FIGURE 5 is an enlarged detail view in vertical section taken substantially upon the plane indicated by the section line 5—5 of FIGURE 4;

FIGURE 6 is a perspective view of the male element of the wear takeup connection of the embodiment of FIGURE 5; and FIGURE 7 is a view similar to FIGURE 2 but of a modification employing spherical seats instead of double conical seats on the male element of the joint.

Referring first to the embodiment disclosed in FIGURES 1–3, it will be observed that the numeral 10 designates a side member forming a portion of the chassis of a motor vehicle, which chassis at the front end thereof has a frame cross-member 12 which may be of either a box type or of a channel member type of construction. Indicated at 14 is a third or idler arm which is pivotally connected at one end to the cross-member 12 and at its other end is pivotally and swivelly connected to a rod 16 forming a portion of the steering linkage of a motor vehicle.

Owing to the vibrations and different movements to which the joints at the two ends of the idler arm are subjected during operation of the vehicle, the two pivotal connections at the opposite ends of the idler arm are subjected to excessive wear and vibration which soon destroy the precision fit of these parts and introduce lost motion and wear thereinto. When this condition occurs, there arises sufficient play in the steering linkage of the vehicle to render the operation of the same dangerous and hazardous. Consequently, it has become necessary in conventional practice to correct this condition from time to time when such play and wear develops to an excessive extent.

It is the primary intent of this invention to provide a replacement construction for the idler arm 14 and its two pivotal connections which will automatically compensate for wear as the same develops and thus eliminate substantially all detrimental play in the pivotal connections of the idler arm and will thus obviate the necessity for frequent repairs as well as maintaining the steering mechanism in a safe and dependable condition of operation.

In the replacement idler arm 14 shown in this embodiment, the opposite ends of the idler arm are provided with socketed or box portions as at 18 and 20, the former being pivotally connected to the frame cross-member 12, while the latter, in turn, is pivotally connected to the steering member 16. Since the pivotal connecting means are substantially identical for these two connections, a description of the pivotal joint at the box end 20 is deemed to be sufficient for an understanding of the principles of the invention claimed herein.

As shown best in FIGURE 2, the box end 20 consists of a cylinder having an integral closure wall 22 at the bottom thereof disposed below the lower portion of the idler arm 14, together with an upstanding skirt, as at 24, arising above the top surface of the idler arm, which skirt is open at its upper end.

Slidably received in the box end of the idler arm are upper and lower sets of segmental wedges, the upper set being indicated by the numeral 26 while the lower set which is complementary thereto is shown by the numeral 28. These wedges have cylindrical exterior surfaces 30 which are slidably received in the cylindrical bore 32 formed in the interior of the box end 20 of the idler arm. The two sets of wedges 26 and 28 have reverse conical interior surfaces, as at 34 and 36, respectively, which seat upon and receive therebetween the reversely tapered conical upper and lower surfaces 38 and 40, respectively, of a pivot pin designated generally by the numeral 42. Below the lower conical surface 40, the pin is provided with a cylindrical surface as at 44 and a conical end surface 46 depends therebeneath, terminating in an externally threaded stem portion 48.

The surface 46 is adapted to be complementary to and to have a tight wedging fit in a correspondingly shaped conical bore 50 with which the steering mechanism rod 16 is customarily provided, and, by means of a washer 52 and lock nut 54 engaged upon the threaded extremity 48, the lower portion of the pin 42 is rigidly and securely locked in the rod 16.

The closure wall 22 of the box 20 is provided with an aperture 54 therethrough, through which the cylindrical portion 44 loosely extends, there being provided a packing ring 56 seated in a recess in this end wall and engaging the cylindrical portion to form a lubricant-tight joint therebetween.

A compression spring 60 is disposed in the upper portion of the box 20 within the skirt 24 thereof, and engages at its lower end upon the upper surfaces of the upper set of wedging elements 26, while its uppermost end butts against a closure plate 62 reatined as by a lock ring 64 in the annular groove 65 in the upper end of the skirt portion 24 of the box end 20 of the idler arm.

A similar construction but disposed in reverse position is provided for the other end of the idler arm, it being noted that the pin 42 at that end extends through a conical shaped opening 66 in the bottom wall 68 of the frame cross-member 12, with the lock washer 52 and lock nut 54 being provided to secure this pin in position.

FIGURES 4–6 show a slightly modified arrangement in which an idler arm mounting bracket 70 is secured to the side frame member 10 of the chassis rather than to the cross-member 12 thereof. In this form, the mounting bracket 70 includes a vertical flange or plate 72 which is detachably secured to the side frame member 10 by fastening bolts and nuts as at 74. Depending from the lower end of this plate of the bracket is a cylindrical box member 76 comprising a female member in which is received the male pin 78. The latter, as also shown in FIGURE 6, has reversed conical upper and lower surfaces, as at 80 and 82, respectively, which are received between the upper and lower wedge members 84 and 86, respectively. These wedge members have their exterior surface cylindrical for a smooth sliding fit in the internal cylindrical bore 88 of the box member 76, while their internal surfaces are reversely conical and are complementary to the surfaces 80 and 82 of the pin 78.

A compression spring 88 abuts at its lower end against the upper set of wedges 84 and at its upper end is seated against the underside of a closure plate 90 which is retained as in the preceding embodiment by a split locking ring 92 received in an annular lock ring groove formed in the box member 76.

At its lower end, the box member is provided with an integral closure wall as at 94, which is apertured as at 96 and is provided with a sealing ring as at 98 to receive therethrough the diametrically enlarged lower cylindrical portion 100 of the pin. This latter, at its lower extremity, is externally threaded as at 102 to be threadedly engaged in a correspongindly threaded bore 104 formed in one end of the idler arm 106. A lock washer 108, together with a locking nut 110 engaged upon the diametrically reduced externally threaded extremity 112 on the end of the pin, serves to fixedly secure this pin to the idler arm. A shouldered end portion 114 serves as a means to rotatably adjust the threaded portion 102 of the pin in the idler arm and to hold this in adjusted position while the lock nut 110 is engaged.

FIGURE 7 discloses a still further modification wherein a box member 120 which may constitute the box members 18 or 20 of the embodiment of FIGURES 1–3 or 76 of the embodiment of FIGURES 4 and 5 is illustrated. This box member has a cylindrical internal bore as at 122, is provided with a bottom closure wall as at 124 and has an open upper end. This closure wall in turn is provided with an aperture 126 therrethrough and a sealing ring 128 is seated in this aperture. A male element in the form of a pin 130 has a cylindrical stem portion 132 extending through this aperture and sealing member, terminating in a diametrically reduced, externally threaded extremity 134 by means of which this pin may be adjusted and may be adjustably secured to other members in the same manner as in either of the preceding embodiments.

At its upper end, the pin 130 is provided with a pair of spherical enlargements, including an upper enlargement 136 and a lower enlargement 138. Upper and lower sets of wedge members 140 and 142 are slidably received in the bore 122 and cooperate with these enlargements, having complementary spherical seating surfaces engaging therewith.

As in the preceding embodiments, a compression spring 146 abuts at its lower end upon the upper wedges 140 and is confined beneath a closure plate 148 retained as by a split locking ring 150 which is secured in a circumferentially extending lock ring channel in the upper portion of the bore 122.

In all of the embodiments previously described, the spring means resiliently urges the upper and lower sets of wedges upon the opposed upper and lower wedging surfaces of the male member of the joint. Consequently, this wedging action takes up all wear in the joint and will urge the male member to its lowermost position. However, when any vibration occurs, the vibration will dislodge or loosen these wedges, whereupon the spring will again re-seat them, thus preventing any tendency of the wedges to bind themselves in too tight a fit upon the male member.

In order to provide long life for this joint, it is contemplated that the joint pin wedging surfaces 38 or 40 and/or the wedge elements 26 and 28 of the embodiment of FIGURES 1–3; or 80 and 82 together with the wedges 84 and 86 of the embodiment of FIGURES 4–6; or 136, 138 together with the wedges 140 and 142 of the embodiment of FIGURE 7 may be conventiently formed by powder metallurgy, this consisting of powdered metal together with lubricant material mixed therewith and molded and pressed into the desired final shape. Such a joint will be self-lubricating, will be cheaply constructed, and will possess the requisite strength and precision of fit.

Further, although in the drawings the clearance between the closure members 62, 90 and 148 with the upper set of wedging elements 26, 80 and 140 has been greatly exaggerated for the purpose of clearness in the drawings, it will be understood that this clearance will be in the order of from five to ten thousandths of an inch.

In applying this invention, it will be evident that the worn joint of the idler arm with its mounting bracket and with the steering member with which it is associated is replaced by a new joint which will not only restore the original precision of fit for these elements but will also be self-compensating as to future wear and because of its self-compensation will be of a much greater life expectancy.

In the arrangement of FIGURES 1–3, the entire original idler arm will be replaced together with its pivotal connections. However, in the arrangement of FIGURES 4–6, the idler arm will be retained in use, the idler arm support bracket being replaced by the replacement element 70 and by the replacement pin 78.

The boxes and pins of the two preceding embodiments may in turn be replaced by the alternative construction of FIGURE 7 in some instances.

Although for purposes of clearness of illustration and understanding of the invention the wear takeup joint has been shown as applied to an idler arm of steering mechanism, it will be understood that in some instances the principles of this invention may be applied to wear takeup joints in general and, accordingly, it is not desired to limit the scope of the invention except as required by the appended claims.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A replacement assembly for idler arms of an automobile steering linkage comprising an idler arm having a pivotal connection at one end for journaling the same upon the chassis of an automobile and having a pivotal connection at its other end for engagement with a portion of a steering linkage, at least one of said pivotal connections including a female member having a bore therein and a male member received therein, said male member including diametrically enlarged reversely varying surfaces, upper and lower wedge means each slidably received in and engaging the wall of the bore in said female member and having wedging surfaces complementary to and engaging those of the male member, resilient means yieldingly and continuously urging said wedge means into wedging contact with said male member and the female member whereby to automatically take up wear therebetween, said diametrically enlarged reversely varying surfaces being conical.

2. A replacement assembly for idler arms of an automobile steering linkage comprising an idler arm having a pivotal connection at one end for journaling the same upon the chassis of an automobile and having a pivotal connection at its other end for engagement with a portion of a steering linkage, at least one of said pivotal connections including a female member having a bore therein and a male member received therein, said male member including diametrically enlarged reversely varying surfaces, upper and lower wedge means each slidably received in and engaging the wall of the bore in said female member and having wedging surfaces complementary to and engaging those of the male member, resilient means yieldingly and continuously urging said wedge means into wedging contact with said male member and the female member whereby to automatically take up wear therebetween, said diametrically enlarged reversely varying surfaces being spherical and axially spaced.

3. A wear takeup pivotal joint comprising a body having a cylindrical chamber therein with a closure wall at one end and with its other end open, said closure wall having an aperture therethrough, a pivot pin having an enlarged portion in said chamber and having one end extending through said aperture, said enlarged portion having surfaces of reversely varying diameters, upper and lower sets of wedge members slidable axially in and slidably engaging the wall of said chamber and having wedge surfaces complementary to and wedgingly engaging said reverse surfaces on said pin, resilient means yieldingly and continuously urging said wedge members axially of said pin and chamber and against said enlarged portions whereby to yieldingly take up wear between said pin and said body, said surfaces of reversely varying diameters being spherical and axially spaced.

4. A replacement assembly for idler arms of an automobile steering linkage comprising an idler arm having a pivotal connection at one end for journaling the same upon the chassis of an automobile and having a pivotal connection at its other end for engagement with a portion of a steering linkage, at least one of said pivotal connections including a female member having a bore therein and a male member received therein, said male member including diametrically enlarged reversely varying surfaces, upper and lower wedge means each slidably received in and engaging the wall of the bore in said female member and having wedging surfaces complementary to and engaging those of the male member, resilient means yieldingly and continuously urging said wedge means into wedging contact with said male member and the female member whereby to automatically take up wear therebetween, said diametrically enlarged reversely varying surfaces being conical, said first-mentioned pivotal connection being secured to a frame cross-member of said chassis.

5. A replacement assembly for idler arms of an automobile steering linkage comprising an idler arm having a pivotal connection at one end for journaling the same upon the chassis of an automobile and having a pivotal connection at its other end for engagement with a portion of a steering linkage, at least one of said pivotal connections including a female member having a bore therein and a male member received therein, said male member including diametrically enlarged reversely varying surfaces, upper and lower wedge means each slidably received in and engaging the wall of the bore in said female member and having wedging surfaces complementary to and engaging those of the male member, resilient means yieldingly and continuously urging said wedge means into wedging contact with said male member and the female member whereby to automatically take up wear therebetween, said diametrically enlarged reversely varying surfaces being conical, said first-mentioned pivotal connection being secured to a frame side member of said chassis.

6. A replacement assembly for idler arms of an automobile steering linkage comprising an idler arm having a pivotal connection at one end for journaling the same upon the chassis of an automobile and having a pivotal connection at its other end for engagement with a portion of a steering linkage, at least one of said pivotal connections including a female member having a bore therein and a male member received therein, said male member including diametrically enlarged reversely varying surfaces, upper and lower wedge means each slidably received in and engaging the wall of the bore in said female member and having wedging surfaces complementary to and engaging those of the male member, resilient means yieldingly and continuously urging said wedge means into wedging contact with said male member and the female member whereby to automatically take up wear therebetween, the pivotal connections at the opposite ends of said idler arm being identical but relatively inverted, the diametrically enlarged reversely varying surfaces being conical.

7. A replacement assembly for idler arms of an automobile steering linkage comprising an idler arm having a pivotal connection at one end for journaling the same upon the chassis of an automobile and having a pivotal connection at its other end for engagement with a portion of a steering linkage, at least one of said pivotal connections including a female member having a bore therein and a male member received therein, said male member including diametrically enlarged reversely varying surfaces, upper and lower wedge means each slidably received in and engaging the wall of the bore in said female member and having wedging surfaces complementary to and engaging those of the male member, resilient means yieldingly and continuously urging said wedge means into wedging contact with said male member and the female member whereby to automatically take up wear therebetween, pivotal connections at the opposite ends of said idler arm being identical but relatively inverted, the reversely varying surfaces being spherical and axially spaced.

References Cited in the file of this patent

UNITED STATES PATENTS

| | | |
|---|---|---|
| 1,261,856 | Rule | Apr. 9, 1918 |
| 1,871,861 | Rossman | Aug. 16, 1932 |
| 1,985,728 | Ingersoll | Dec. 25, 1934 |
| 2,037,786 | Hufferd | Apr. 21, 1936 |
| 2,048,803 | Marles | July 28, 1936 |
| 2,544,582 | Booth | Mar. 6, 1951 |
| 2,745,688 | Farrington et al. | May 15, 1956 |
| 2,853,327 | Traugott | Sept. 23, 1958 |

FOREIGN PATENTS

| | | |
|---|---|---|
| 513,858 | Italy | Feb. 7, 1955 |